United States Patent [19]

Scott et al.

[11] Patent Number: 4,984,370
[45] Date of Patent: Jan. 15, 1991

[54] GUN SIGHT

[75] Inventors: Fraser Scott, Guildford; Raymond G. Budden, Havant, both of England

[73] Assignee: Ring Sights Worldwide Limited, Bordon, England

[21] Appl. No.: 475,008

[22] Filed: Feb. 5, 1990

[30] Foreign Application Priority Data

Feb. 7, 1989 [GB] United Kingdom ............... 8902687

[51] Int. Cl.$^5$ ............................................. F41G 1/30
[52] U.S. Cl. ...................................... 33/241; 33/233; 356/251; 356/247
[58] Field of Search ............... 33/241, 233, 251, 247, 33/242; 354/224, 219; 356/247, 251; 42/100, 103

[56] References Cited

U.S. PATENT DOCUMENTS

| | | | |
|---|---|---|---|
| 3,439,970 | 4/1969 | Rickert | 33/233 |
| 4,055,000 | 10/1977 | Cesin | 33/241 |
| 4,136,963 | 1/1979 | Budden et al. | 33/241 |
| 4,390,276 | 6/1983 | Budden et al. | 33/233 |
| 4,593,984 | 6/1986 | Kimura et al. | 354/219 |

FOREIGN PATENT DOCUMENTS

| | | | |
|---|---|---|---|
| 0130048 | 4/1919 | United Kingdom | 356/251 |
| 2208014 | 2/1989 | United Kingdom | 33/233 |

Primary Examiner—William A. Cuchlinski, Jr.
Assistant Examiner—William C. Dowling
Attorney, Agent, or Firm—Scrivener and Clarke

[57] ABSTRACT

A gun sight comprises a block of transparent material having a line of sight therethrough between a target end and a viewing end. A graticule pattern is mounted to the, in use, top surface of the sight whereby it may be illuminated by light from the sky generally above the sight. The block has a first internally reflecting surface disposed below the graticule pattern and aligned to reflect light therefrom to a second reflecting surface, which in turn is aligned to reflect light from the graticule to a partially reflective doublet lens system in the line of sight. The partially reflective doublet pattern reflects said doubly reflected light to form a virtual image of the graticule at infinity in the line of sight.

6 Claims, 1 Drawing Sheet

GUN SIGHT

The present invention relates to a gun sight. More particularly, it relates to a collimator gun sight of the type in which a target is viewed along an axis of the sight and the image of a graticule pattern is reflected within the sight to lie also on this axis.

Collimator gun sights of the above type are well known from, e.g. British patents nos. 2049118 and 2056634. One disadvantage with these gun sights is that the optics are arranged so that the graticule aiming pattern is illuminated by ambient light from the area adjacent to the target. This has hitherto been thought advantageous since the illumination level of the graticule patter varies automatically with the ambient light level in the region of the target. However, where the target is located e.g. beneath a tree or the like, the level of illumination for the graticule pattern is reduced. This is clearly disadvantageous.

It is an object of the present invention to provide a gun sight which overcomes the above disadvantage and allows an increased amount of light to illuminate the graticule aiming pattern.

According to the present invention there is provided a gun sight of the type in which a target is viewed along an axis of the sight and the image of a graticule pattern is reflected within the sight to lie also on said axis, in which the graticule pattern is mounted to the, in use, top surface of the sight whereby it may be illuminated by light from the sky generally above the sight.

Preferably the sight has an additional reflecting surface below the graticule pattern whereby the remaining optics of the sight may be substantially conventional.

The graticule pattern may be a transmissive graticule, optionally a transmissive film graticule.

The graticule is advantageously rectangular in overall shape to increase the aperture and give improved illumination.

An embodiment of the present invention will now be more particularly described by way of example and with reference to the accompanying drawings, in which.

Figure 1:
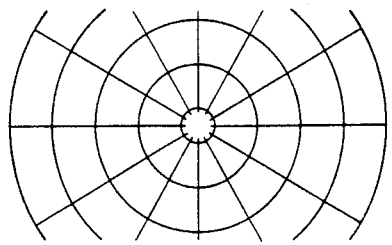
FIG. 1 shows one type of graticule pattern for use with the sight of the invention.

Referring now to the drawings, the sight is formed of an optically transparent material such as a suitable glass. It comprises a number of parts cemented together to form a block which, after assembly, is painted with black epoxy paint, except for entry and exit faces and a graticule illumination face.

Light from the target enters at face 1, while the user looks through face 2. Faces 1 and 2 are parallel one to the other and normal to a line of sight through the sight. Thus, light from the target passes through the gun sight without deviation.

A graticule 3, shown in more detail in FIG. 1, is disposed on the top surface (in use) of the sight close to the entry face. The graticule 3 is a transmissive film graticule and may be illuminated by means of light from the sky above the gun sight. An image of the graticule is reflected firstly by angled lower face 4 of sight main block 5. Face 4 is firstly aluminised before being painted so as to make it reflective, and is angled at 45° to the lower surface of the block 5 so that the image of the graticule is reflected to rear surface 6 which is similarly aluminised before painting. The surface 6 is angled at approximately 96.6° with respect to the base of block 5 so that the image of the graticule is reflected therefrom to a concave partially reflecting surface 7. Surface 7 is formed within a doublet pair of lenses having a transmission of between 20 and 25%. The image is then reflected by the concave partially reflecting surface to the viewing face 2.

When the graticule is located at a distance, after reflections, from the concave surface which substantially equals or approximates the focal length of the concave partially reflective surface, the image of the graticule seen by the user appears to be substantially at or near infinity.

As can be seen, the graticule is rectangular and therefore the horizontal aperture is increased. Furthermore, since the graticule faces upwardly, it is illuminated by light from above and therefore the level of illumination is increased, since light from above is usually brighter than that from the target area. This means that the graticule pattern may be picked up more readily by users of the sight.

Figure 2:
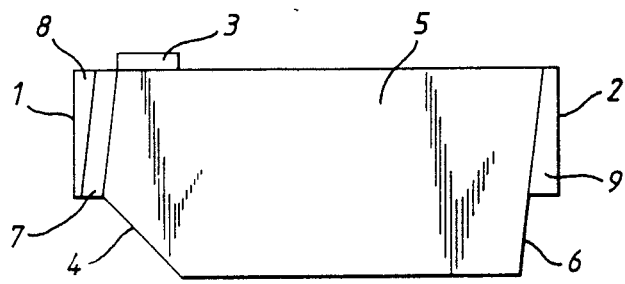
FIG. 2 is a side elevation of the gun sight.
Figure 3:
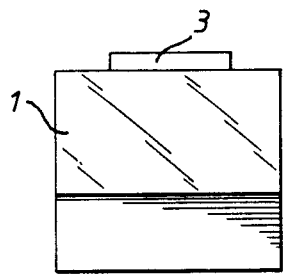
FIG. 3 is an end elevation of the sight as viewed by a user.
Figure 4:
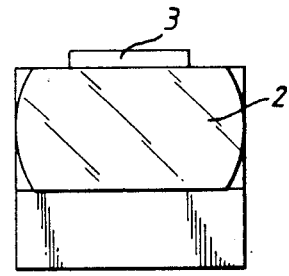
FIG. 4 is an end elevation of the sight as viewed from the target direction.
Figure 5:
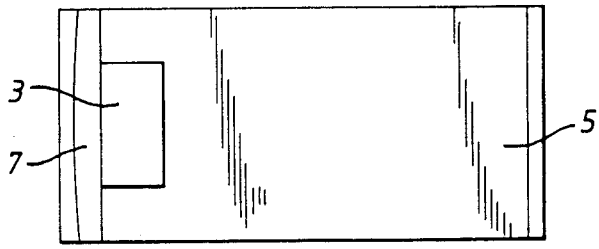
FIG. 5 is a plan view of the sight.

As can be seen from FIG. 2, main block 5 has its end faces at an angle so that reflecting face 6 may reflect the graticule image to concave partially reflective surface 7, which is also angled with respect to block 5 so that the resultant image appears in the line of sight. In order to ensure that the target image passes directly through the sight, faces 1 and 2 are formed on patch plates 8 and 9 respectively, to give parallel ends normal to the line of sight.

The sight described above may be made shorter than conventional sights of this type, since the graticule image is reflected off two plane faces and the concave surface as opposed to the hitherto known single reflective surface and the concave surface. Since the sight is shorter, it finds particular utility with pistols, although other uses may be easily envisaged.

The sight is designed to take graticule illumination from the sky and thereby improve graticule recognition by the user. However, of course, for use at night, some form of illumination must be provided. For example, a betalight of possibly 800 microlamberts may be used. In the connection, the position of the graticule 3 makes use of such illumination devices easier.

We claim:

1. A gun sight comprising a block of transparent material having a line of sight therethrough between a target end and a viewing end, and a graticule pattern mounted to the, in use, top surface of the sight whereby it may be illuminated by light from the sky generally above the sight, the block having a first internally reflecting surface disposed below the graticule pattern and aligned to reflect light therefrom to a second reflecting surface, which in turn is aligned to reflect light from the graticule to a partially reflective doublet lens system in the line of sight, which reflects said doubly reflected light to form an image of the graticule at infinity in the line of sight.

2. A gun sight as claimed in claim 1, wherein the graticule pattern is disposed at a distance from the partially reflective doublet lens system along the path taken by the doubly reflected light which is substantially equal to the focal length of the lens system.

3. A gun sight as claimed in claim 1, wherein the graticule pattern is a transmissive film graticule.

4. A gun sight as claimed in claim 1, wherein the graticule is rectangular in overall shape to increase the aperture and give improved illumination.

5. A gun sight as claimed in claim 1, wherein the graticule pattern comprises five concentric circles, spaced one from the next, the inner diameter of the first being 0.5 mm and its outer diameter 0.7 mm, the inner diameter of the second being 1.0 mm and its outer diameter 1.15 mm, the inner diameter of the third being 2.0 mm and its outer diameter 2.15 mm, the inner diameter of the fourth being 3.0 mm and its outer diameter 3.15 mm, and the inner diameter of the fifth being 4.0 mm and its outer diameter 4.15 mm.

6. A gun sight as claimed in claim 5, wherein the graticule pattern comprises twelve radial lines, angularly spaced one from the next by 30° and each being 0.05 mm in thickness.

* * * * *